US012457553B2

(12) United States Patent
Elmali et al.

(10) Patent No.: US 12,457,553 B2
(45) Date of Patent: Oct. 28, 2025

(54) NETWORK DEVICE AND CLIENT DEVICE

(71) Applicant: Nokia Technologies Oy, Espoo (FI)

(72) Inventors: Ugur Baran Elmali, Munich (DE); Philippe Godin, Massy (FR); Subin Narayanan, Oulu (FI); Esa Mikael Malkamäki, Espoo (FI); Salman Nadaf, Munich (DE); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/955,812

(22) Filed: Nov. 21, 2024

(65) Prior Publication Data
US 2025/0106764 A1    Mar. 27, 2025

Related U.S. Application Data

(63) Continuation of application No. 18/797,567, filed on Aug. 8, 2024.

(30) Foreign Application Priority Data

Sep. 27, 2023  (FI) ...................................... 20236070

(51) Int. Cl.
*H04W 52/02* (2009.01)
*H04W 68/02* (2009.01)
*H04W 76/27* (2018.01)
*H04W 76/40* (2018.01)

(52) U.S. Cl.
CPC ... *H04W 52/0216* (2013.01); *H04W 52/0219* (2013.01); *H04W 68/02* (2013.01); *H04W 76/27* (2018.02); *H04W 76/40* (2018.02)

(58) Field of Classification Search
CPC . H04W 76/40; H04W 52/0216; H04W 76/27; H04W 4/06
See application file for complete search history.

(56) References Cited

U.S. PATENT DOCUMENTS

2013/0107727 A1*  5/2013  Lunden ............. H04W 52/0216
                                                                370/252

FOREIGN PATENT DOCUMENTS

| CN | 116347362 A | 6/2023 |
| WO | 2021/081550 A1 | 4/2021 |
| WO | 2022/002830 A1 | 1/2022 |

(Continued)

OTHER PUBLICATIONS

"New Work Item on NR support of Multicast and Broadcast Services", 3GPP TSG RAN Meeting #86, RP-193248, Agenda: 9.1.2, Huawei, Dec. 9-12, 2019, 5 pages.

(Continued)

*Primary Examiner* — Diane D Mizrahi
(74) *Attorney, Agent, or Firm* — Brake Hughes Bellermann LLP (57) ABSTRACT

According to an example embodiment, a network device is configured to:
generate an indicator based on at least one of an activation status of a multicast session or a data inactivity status; and transmit the indicator to a client device, wherein the indicator indicates to the client device whether the client device should wait for a paging message for the multicast session and stop monitoring data of the multicast session while the client device is in an inactive state.

16 Claims, 9 Drawing Sheets

(56) References Cited

FOREIGN PATENT DOCUMENTS

| WO | 2022/084537 A1 | 4/2022 |
|---|---|---|
| WO | 2023/136664 A1 | 7/2023 |

OTHER PUBLICATIONS

"New SID: Architectural enhancements for 5G multicast-broadcast services Phase 2", TSG SA Meeting #SP-94E, SP-211645, Agenda: 9.1.3, Huawei, Dec. 14-20, 2021, pp. 1-5.

"3rd Generation Partnership Project; Technical Specification Group Services and System Aspects; Study on architectural enhancements for 5G multicast-broadcast services; Phase 2 (Release 18)", 3GPP TR 23.700-47, V0.3.0, May 2022, pp. 1-93.

"New WID: Enhancements of NR Multicast and Broadcast Services", 3GPP TSG RAN Meeting #94-e, RP-213568, Agenda: 8A.2, CATT, Dec. 6-17, 2021, 5 pages.

"Msc-generator", Sourceforge, Retrieved on Dec. 4, 2024, Webpage available at : https://sourceforge.net/projects/msc-generator/.

"38.300 Running CR for MBS enhancements", 3GPP TSG-RAN2 Meeting #123, R2-2309034, CMCC, Aug. 21-25, 2023, 13 pages.

Office action received for corresponding Finnish Patent Application No. 20236070, dated Apr. 15, 2024, 10 pages.

"On support of multicast reception in RRC_Inactive state", 3GPP TSG-RAN WG3 Meeting #117bis-e, R3-225451, Agenda: 15.3, Ericsson, Oct. 10-18, 2022, pp. 1-8.

International Search Report and Written Opinion received for corresponding Patent Cooperation Treaty Application No. PCT/EP2024/074275, dated Dec. 5, 2024, 12 pages.

"Discussion on Notifications and RRC state transitions", 3GPP TSG-RAN WG2 Meeting #121, R2-2300179, Agenda: 8.11.2.2, CATT, Feb. 27-Mar. 3, 2023, 8 pages.

"Control plane aspects of multicast reception in RRC_Inactive state", 3GPP TSG-RAN WG2 Meeting #123bis, R2-2310797, Agenda: 7.11.2.1, Nokia, Oct. 9-13, 2023, 15 pages.

Extended European Search Report received for corresponding European Patent Application No. 24198553.0, dated Feb. 11, 2025, 4 pages.

Office action received for corresponding European Patent Application No. 24198553.0, dated Feb. 21, 2025, 6 pages.

* cited by examiner

NETWORK DEVICE AND CLIENT DEVICE

RELATED APPLICATION

This application is a continuation of U.S. patent application Ser. No. 18/797,567, filed on Aug. 8, 2024, which claims priority from Finnish Patent Application No. 20236070 filed on Sep. 27, 2023. The disclosures of the prior applications are hereby incorporated by reference in their entirety.

TECHNICAL FIELD

The present application generally relates to the field of wireless communications. In particular, the present application relates to a network device, a client device, and related methods and computer programs.

BACKGROUND

In fifth generation (5G) cellular networks, a client device, such as a user equipment (UE) can transition into an inactive state when, for example, there is no traffic to the client device in order to save power. This can be referred to as a radio resource control (RRC) inactive (RRC_INACTIVE) state. However, various issue may arise due to the client device being in the inactive state.

SUMMARY

The scope of protection sought for various example embodiments is set out by the independent claims. The example embodiments and features, if any, described in this specification that do not fall under the scope of the independent claims are to be interpreted as examples useful for understanding various example embodiments.

An example embodiment of a network device comprises at least one processor and at least one memory storing instructions. The instructions, when executed by the at least one processor, cause the network device to: generate an indicator based on at least one of an activation status of a multicast session or a data inactivity status; and transmit the indicator to a client device, wherein the indicator indicates to the client device whether the client device should wait for a paging message for the multicast session and stop monitoring data of the multicast session while the client device is in an inactive state.

An example embodiment of a network device comprises means for performing: generate an indicator based on at least one of an activation status of a multicast session or a data inactivity status; transmit the indicator to a client device, wherein the indicator indicates to the client device whether the client device should wait for a paging message for the multicast session and stop monitoring data of the multicast session while the client device is in an inactive state.

In an example embodiment, alternatively or in addition to the above-described example embodiments, the data inactivity status is based on whether the network device has received data for the multicast session within a predetermined time duration.

In an example embodiment, alternatively or in addition to the above-described example embodiments, the network device is further caused to transmit the indicator in a radio resource control, RRC, release message or in a multicast and broadcast control channel, MCCH.

An example embodiment of a client device comprises at least one processor and at least one memory storing instructions. The instructions, when executed by the at least one processor, cause the client device to: obtain an indication from a network device, wherein the indication indicates to the client device whether the client device should wait for a paging message for the multicast session and stop monitoring data of the multicast session while the client device is in an inactive state; and based on the obtained indication, monitor the data of the multicast session while the client device is in the inactive state if the indication indicates that the client device should not wait for the paging message.

An example embodiment of a client device comprises means for performing: obtain an indication from a network device, wherein the indication indicates to the client device whether the client device should wait for a paging message for the multicast session and stop monitoring data of the multicast session while the client device is in an inactive state; and based on the obtained indication, monitor the data of the multicast session while the client device is in the inactive state if the indication indicates that the client device should not wait for the paging message.

In an example embodiment, alternatively or in addition to the above-described example embodiments, the client device is further caused to, based on the obtained indication, wait for the paging message for the multicast session and stop monitoring the data of the multicast session while the client device is in the inactive state, if the indication indicates that the client device should wait for the paging message for the multicast session and stop monitoring the data of the multicast session.

In an example embodiment, alternatively or in addition to the above-described example embodiments, the obtaining the indication comprises receiving an indicator, wherein the indicator explicitly indicates to the client device whether the client device should wait for a paging message for the multicast session and stop monitoring data of the multicast session while the client device is in the inactive state from network device or detecting an absence of the indicator from the network device.

In an example embodiment, alternatively or in addition to the above-described example embodiments, the multicast session comprises an active multicast session.

In an example embodiment, alternatively or in addition to the above-described example embodiments, the client device is further caused to obtain the indicator in a radio resource control, RRC, release message or in a multicast and broadcast control channel, MCCH.

In an example embodiment, alternatively or in addition to the above-described example embodiments, the client device is further caused to, in response to the indication indicating that the client device should not wait for the paging message for the multicast session and monitor the data of the multicast session, keep radio bearers for the multicast session active and monitor the data of the multicast session while the client device is in the inactive state.

In an example embodiment, alternatively or in addition to the above-described example embodiments, monitoring the data of the multicast session comprises monitoring a group radio network temporary identifier, G-RNTI, of the multicast session.

In an example embodiment, alternatively or in addition to the above-described example embodiments, the client device is further caused to, in response to obtaining the indication from a network device controlling a first cell and selecting a second cell controlled by a second network device for camping in the inactive state, receive the paging message according to the indication while the client device is camping in the second cell.

In an example embodiment, alternatively or in addition to the above-described example embodiments, the client device is further caused to, in response to the indication indicating that the client device should not wait for the paging message for the multicast session and monitor the data of the multicast session, switch to a connected state from the inactive state in response to at least one criterion being met.

In an example embodiment, alternatively or in addition to the above-described example embodiments, the at least one criterion comprises at least: the client device being sent to the inactive state from the connected state in a first cell controlled by the network device, the client device switching to a second cell to camp in the inactive state; and the client device not finding a multicast and broadcast control channel, MCCH, in the second cell.

An example embodiment of a method comprises: generating, by a network device, an indication based on at least one of an activation status of a multicast session or a data inactivity status; and transmitting, by the network device, the indication to a client device, wherein the indication indicates to the client device whether the client device should wait for a paging message for the multicast session and stop monitoring data of the multicast session while the client device is in an inactive state.

An example embodiment of a method comprises: obtaining, by a client device, an indication from a network device, wherein the indication indicates to the client device whether the client device should wait for a paging message for the multicast session and stop monitoring data of the multicast session while the client device is in an inactive state; and based on the obtained indication, monitoring, by the client device, the data of the multicast session while the client device is in the inactive state if the indication indicates that the client device should not wait for the paging message.

An example embodiment of a computer program product comprises program code configured to perform the method according to any of the above example embodiments when the computer program product is executed on a computer.

DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

Figure 1:
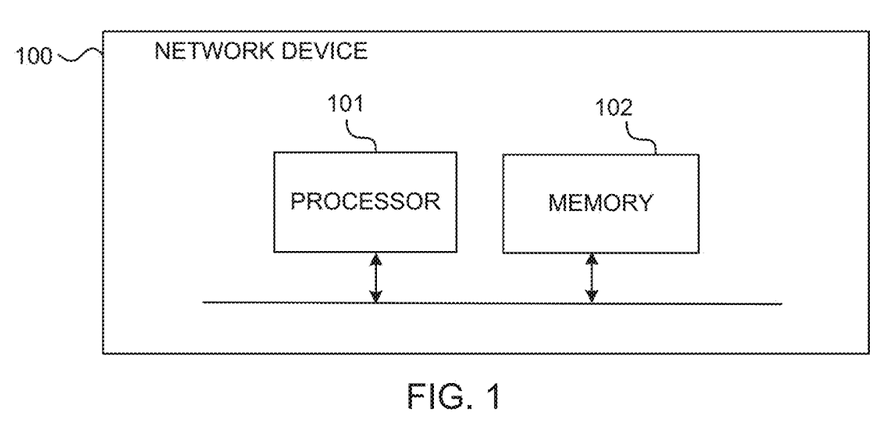
FIG. 1 illustrates an example embodiment of the subject matter described herein illustrating a network device.

FIG. 1 is a block diagram of a network device 100 configured in accordance with an example embodiment.

The network device 100 may comprise one or more processors 101 and one or more memories 102 that comprise instructions. The network device 100 may also comprise at least one antenna port, as well as other elements, such as an input/output module, a transceiver, and/or a communication interface (not shown in FIG. 1).

According to an example embodiment, the instructions, when executed by the at least one processor, cause the network device 100 to: generate an indicator based on at least one of an activation status of a multicast session or a data inactivity status; transmit the indicator to a client device, wherein the indicator indicates to the client device whether the client device should wait for a paging message for the multicast session and stop monitoring data of the multicast session while the client device is in an inactive state.

The indicator may also be referred to as an indication, a paging indicator, a paging indication, or similar.

For example, in some example embodiments, the network device 100 may provide a "wait for paging" indicator in a radio resource control (RRC) release message to a user equipment (UE), wherein the indicator indicates to the UE whether the UE should wait for paging for a specific multicast session or for all multicast sessions, or not wait for paging for the specific multicast session or for all multicast sessions. The network device 100 may transmit the RRC release message due to, for example, there temporarily being no data in a multicast service for transmission to the UE. Alternatively or additionally, the network device 100 may transmit the indicator to the client device in other messages and/or situations such as those disclosed herein.

A multicast service can be provided over a multicast session. Herein, a multicast session and multicast service can be used interchangeably.

According to an example embodiment, the data inactivity status is based on whether the network device has received data for the multicast session within a predetermined time duration. In other words, if the network device has not received any data for the multicast within a predetermined time duration, then the inactivity status of the data may be set to inactive. In such case the indicator may indicate to the UE to wait for paging. If there is data incoming, the indicator may indicate to the client device to keep monitoring for data and not wait for.

According to an example embodiment, the activity status of the multicast session may be e.g. inactive/deactivated or active. For inactive/deactivated status, the indicator may indicate to the UE to wait for paging. For active status, the indicator may indicate to the client device to keep on monitoring data from the multicast session (and not wait for paging) despite the client device being sent to inactive mode. Even for active multicast session, there may temporarily be no data transmission for the client device.

Although the network device 100 may be depicted to comprise only one processor 101, the network device 100 may comprise more processors. In an example embodiment, the memory 102 is capable of storing instructions, such as an operating system and/or various applications.

Furthermore, the processor 101 may be capable of executing the stored instructions. In an example embodiment, the processor 101 may be embodied as a multi-core processor, a single core processor, or a combination of one or more multi-core processors and one or more single core processors. For example, the processor 101 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 101 may be configured to execute hard-coded functionality. In an example embodiment, the processor 101 is embodied as an executor of software instructions, wherein the instructions may specifically configure the processor 101 to perform the algorithms and/or operations described herein when the instructions are executed.

The memory 102 may be embodied as one or more volatile memory devices, one or more non-volatile memory devices, and/or a combination of one or more volatile memory devices and non-volatile memory devices. For example, the memory 102 may be embodied as semiconductor memories (such as mask ROM, PROM (programmable ROM), EPROM (erasable PROM), flash ROM, RAM (random access memory), etc.).

When the network device 100 is configured to implement some functionality, some component and/or components of the network device 100, such as the at least one processor 101 and/or the memory 102, may be configured to implement this functionality. Furthermore, when the at least one processor 101 is configured to implement some functionality, this functionality may be implemented using program code comprised, for example, in the memory 102. For example, if the network device 100 is configured to perform an operation, the at least one memory 102 and the computer program code can be configured to, with the at least one processor 101, cause the network device 100 to perform that operation.

The network device 100 may comprise, for example, a base station (BS), a next generation nodeB (gNB), or any such device providing an air interface for client devices to connect to the wireless network via wireless transmissions.

Some terminology used herein may follow the naming scheme of 4G or 5G technology in its current form. However, this terminology should not be considered limiting, and the terminology may change over time. Thus, the following discussion regarding any example embodiment may also apply to other technologies.

Figure 2:
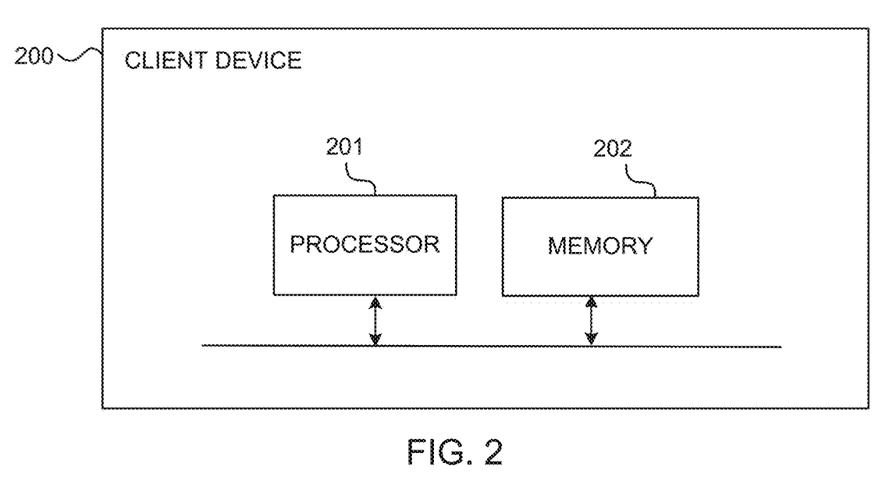
FIG. 2 illustrates an example embodiment of the subject matter described herein illustrating a client device.

FIG. 2 is a block diagram of a client device 200 configured in accordance with an example embodiment.

The client device 200 may comprise one or more processors 201 and one or more memories 202 that comprise instructions. The client device 200 may also comprise at least one antenna port, as well as other elements, such as an input/output module, a transceiver, a display, and/or a communication interface (not shown in FIG. 2).

According to an example embodiment, the instructions, when executed by the at least one processor, cause the client device 200 to: obtain an indication from a network device 100, wherein the indication indicates to the client device 200 whether the client device 200 should wait for a paging message for the multicast session and stop monitoring data of the multicast session while the client device 200 is in an inactive state; and based on the obtained indication, monitor the data of the multicast session while the client device 200 is in the inactive state if the indication indicates that the client device should not wait for the paging message The client device 200 may comprise, for example, a UE.

Herein, paging may also be referred to as a paging message or similar.

According to an example embodiment, the client device 200 is further caused to, based on the obtained indication, wait for the paging message for the multicast session and stop monitoring the data of the multicast session while the client device 200 is in the inactive state, if the indication indicates that the client device should wait for the paging message for the multicast session and stop monitoring the data of the multicast session.

The client device 200 may comprise a configuration related to a multicast session and the paging can indicate activation of the multicast session for the client device 200 or indicate that data arrives for the multicast session.

For example, if the indication indicates that the client device 200 needs to wait for paging for the multicast session, the client device 200 can suspend the multicast radio bearer (MRB) associated with the multicast session.

If the indication indicates that the client device 200 does not need to wait for paging, the client device 200 may not suspend the MRB (i.e. keep the MRB active) and may receive group radio network temporary identifier (G-RNTI) for data of the multicast session.

If the client device 200 obtains another indication indicating that the client device 200 needs to wait for paging for the multicast session, the client device 200 may ignore the previously obtained indication.

According to an example embodiment, the obtaining the indication comprises receiving an indicator from the network device. In this case the indicator may explicitly indicate to the client device 200 whether the client device 200 should wait for the paging message for the multicast session and stop monitoring data of the multicast session, while the client device 200 is in the inactive state.

According to another example embodiment, the obtaining the indication comprises detecting an absence of the indicator from the network device. In a first embodiment in a case where the client device does not receive such indicator from the network device, the client device may interpret this as a trigger to wait for the paging message for the multicast session and stop monitoring data of the multicast session, while the client device 200 is in the inactive state. In a second embodiment in a case where the client device does not receive such indicator from the network device, the client device may interpret this as a trigger to not wait for the paging message for the multicast session and keep monitoring data of the multicast session, while the client device 200 is in the inactive state. The behavior of the client device in such situation (i.e. whether to perform first or second embodiment) may be preconfigured.

In the following most of the examples are written so that obtaining the indication comprises receiving the indicator from the network device. However, the embodiments are also applicable for the case where obtaining the indication is performed by detecting the absence of the indicator (i.e. by not receiving the indicator).

For example, in some example embodiments, when a UE receives a "wait for paging" indicator in a RRC release message, the UE may not expect to receive G-RNTI for that service and suspends the MRBs of the multicast session until the UE receives group paging for the corresponding service indicating activation of the multicast session or data arrival for the multicast session. The UE may perform this regardless of the value of session status it may receive in the RRC release message, for example even if the UE receives the session status is active.

For example, in some example embodiments, when the UE receives the "do not wait for paging" indicator, the UE may assume that the session is active and may not suspend the MRBs of the multicast session and continues monitoring the G-RNTI for the multicast session. As said above, in some embodiments, non-existence of the "wait for paging" indicator can function as an indicator that the UE should not wait for paging for the multicast session.

In some example embodiments, the indicator is transmitted alternatively or additionally in a multicast and broadcast control channel (MCCH) to a UE. When a UE checks MCCH for a specific service and detects the "wait for paging" indicator although the session is active, the UE may not wait for the G-RNTI, suspends MRBs for service, and waits for paging for the multicast session.

Although the client device 200 may be depicted to comprise only one processor 201, the client device 200 may comprise more processors. In an example embodiment, the memory 202 is capable of storing instructions, such as an operating system and/or various applications.

Furthermore, the processor 201 may be capable of executing the stored instructions. In an example embodiment, the processor 201 may be embodied as a multi-core processor, a single core processor, or a combination of one or more multi-core processors and one or more single core processors. For example, the processor 201 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 201 may be configured to execute hard-coded functionality. In an example embodiment, the processor 201 is embodied as an executor of software instructions, wherein the instructions may specifically configure the processor 201 to perform the algorithms and/or operations described herein when the instructions are executed.

The memory 202 may be embodied as one or more volatile memory devices, one or more non-volatile memory devices, and/or a combination of one or more volatile memory devices and non-volatile memory devices. For example, the memory 202 may be embodied as semiconductor memories (such as mask ROM, PROM (programmable ROM), EPROM (erasable PROM), flash ROM, RAM (random access memory), etc.).

When the client device 200 is configured to implement some functionality, some component and/or components of the client device 200, such as the at least one processor 201 and/or the memory 202, may be configured to implement this functionality. Furthermore, when the at least one processor 201 is configured to implement some functionality, this functionality may be implemented using program code comprised, for example, in the memory 202. For example, if the client device 200 is configured to perform an operation, the at least one memory 202 and the computer program code can be configured to, with the at least one processor 201, cause the client device 200 to perform that operation.

At least some example embodiments disclosed herein can, for example, enable the client device 200 to stop monitoring for G-RNTI, suspend MRBs, and save power during periods of time where no data is delivered for a multicast service when the 5G core keeps the session status for this multicast service active. At least some example embodiments can also enable the client device 200 to obtain information to enable necessary connections to the network.

Figure 3:
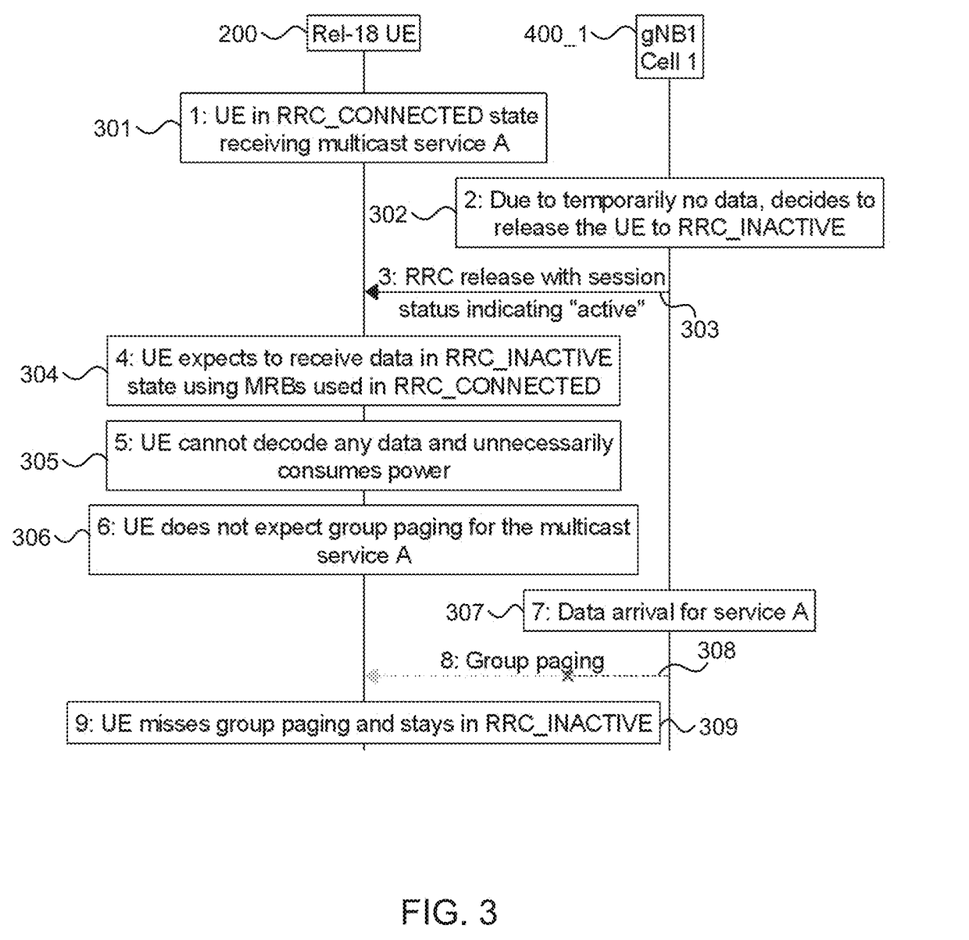
FIG. 3 illustrates a schematic representation of a signaling diagram according to an example.

FIG. 3 illustrates a schematic representation of a signaling diagram according to an example.

In Rel-17, a gNB can send a UE 200 to RRC_INACTIVE state for, for example, power saving, if the following conditions are satisfied:
1) All the multicast sessions that the UE 200 has joined have inactive/deactivated status; or
2) The multicast sessions that the UE 200 has joined have active status, but there is temporarily no activity (i.e. no incoming data) in the user plane.

A Rel-17 UE 200 is unaware of which of cases (1) and (2) above caused the UE to be sent into RRC_INACTIVE state, as "session activation status" is unknown to a Rel-17 UE 200. For both cases, the UE 200 starts to wait for paging for the multicast session after being sent to RRC_INACTIVE state. For case (1), the gNB pages once a session gets activated, and for case (2), the gNB pages once some data arrives for the multicast session so that the UE 200 is brought back to the RRC_CONNECTED state for data reception.

However, Rel-18 introduces multicast reception in RRC_INACTIVE state, on top of Rel-17 mechanism for reception in the RRC_CONNECTED state. Therefore, a Rel-18 UE 200 can be sent to the RRC_INACTIVE state and can be expected to receive multicast transmission, i.e., the UE 200 does not wait for paging.

RRC release message can be used when sending UE 200 to the RRC_INACTIVE state, which can include the point-to-multipoint (PTM) configuration that the UE 200 needs for receiving multicast. Furthermore, a periodic MCCH can indicate the PTM configuration that the UE 200 needs to use in the RRC_INACTIVE state multicast reception. If an RRC_INACTIVE UE 200 does not have the PTM configuration for an "active" multicast session, it reconnects and comes back to RRC_CONNECTED state for multicast reception (because perhaps the audience size is not that large and UEs are served in RRC_CONNECTED).

For a Rel-18 UE 200, to know such "session activation status", a "session status" can be indicated both in RRC release and MCCH. That way, the UE 200 in the RRC_INACTIVE state can distinguish between an active and inactive multicast session, and the UE 200 can use this to determine whether to come back to the RRC_CONNECTED state or stay in the RRC_INACTIVE state.

Furthermore, in RRC release message, the UE 200 can be indicated whether to continue the MRBs that the UE was using in the RRC_CONNECTED state, also in the RRC_INACTIVE state, to have service continuity without interruptions when transitioning from the RRC_CONNECTED state to the RRC_INACTIVE state. The "session status" may be utilized for such a purpose, so that the UE 200 suspends the MRBs it was using in the RRC_CONNECTED state if they are for "inactive" multicast sessions and the UE 200 does not suspend the MRBs it was using in the RRC_CONNECTED state if they are for "active" multicast sessions.

However, there are problematic scenarios that can arise with such framework. For example, a UE 200 can be in the RRC_CONNECTED state receiving multicast service A 301. If the gNB decides 302 to release the UE 200 to the RRC_INACTIVE state for an "active" multicast session due to case (2) mentioned above and transmits an RRC release message 303 from cell 1 400_1 to the UE 200, the UE 200 would not suspend MRBs. The UE expects 304 to receive data in the RRC_INACTIVE state using MRBs used in the RRC_CONNECTED state and tries to decode 305 the multicast service although there is temporarily no data, and the UE 200 does not stop monitoring G-RNTI for that service. Such a situation could lead to unnecessary power consumption at the UE 200. Simply, the UE 200 cannot understand the reason why it was sent to the RRC_INACTIVE state.

Further, the UE 200 does not expect 306 group paging for the multicast service A. Thus, when data arrives 307 for service A and gNB1 performs group paging 308, the UE 200 can miss 309 the group paging and stay in the RRC_INACTIVE state.

Figure 4:
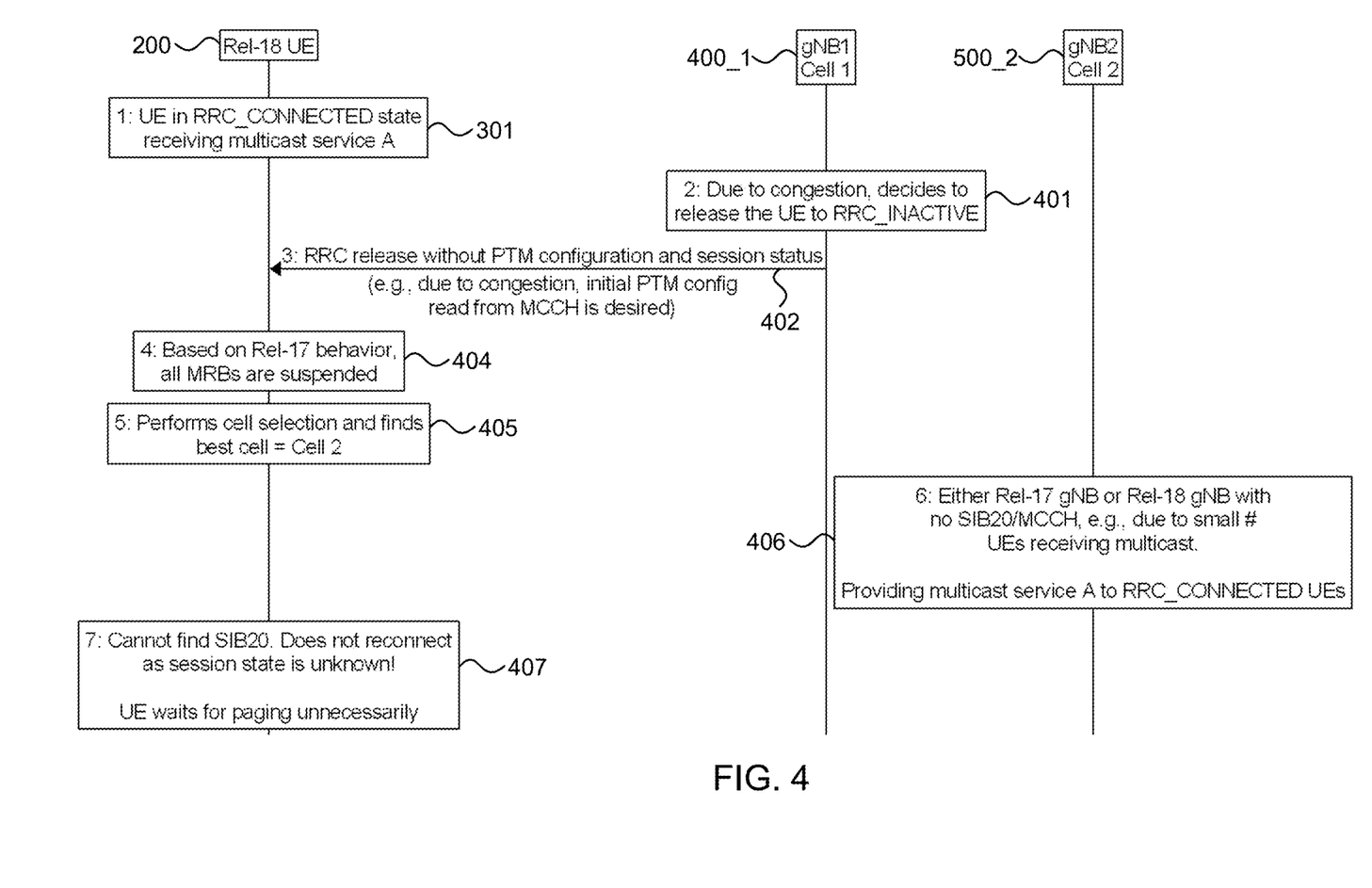
FIG. 4 illustrates a schematic representation of a signaling diagram according to an example.

FIG. 4 illustrates a schematic representation of a signaling diagram according to an example.

The UE 200 may be sent to the RRC_INACTIVE state without having any "session status" provided by gNB1 in the RRC release message 402. For example, cell 1 of gNB1 400_1 may be in a congested state 401 and gNB1 may want to keep the RRC release size minimal and desire the UE 200 to learn about session status via MCCH. In such a case, the UE 200 can end up initially camping in a different cell that does not provide SIB20/MCCH. For example, in the example of FIG. 4, the UE 200 suspends 404 all MRBs and performs cell selection 405. For example, the new cell may be Rel-17 gNB or Rel-18 gNB with a small audience size for multicast services 406, such as cell 2 of gNB2 500_2 in the example of FIG. 4. The "session status" for the UE 200 may then be unknown. In such a case, the behavior of the UE 200 is not defined, and the UE 200 may not find SIB20 and may not reconnect as the session state is unknown 407.

As seen from the exemplary scenarios of FIGS. 3 and 4, some solutions for the RRC_INACTIVE state multicast may create problems when the UE 200 is sent to the RRC_INACTIVE state for different purposes. Therefore, means are needed for an improved UE behavior after being sent to the RRC_INACTIVE state. For example, after being sent to the RRC_INACTIVE state, the UE 200 may be unable determine whether it should stay in the RRC_INACTIVE state and wait for paging for the multicast session, it should stay in the RRC_INACTIVE state and wait for data reception, and/or it should go to the RRC_CONNECTED state for data reception.

Figure 5:
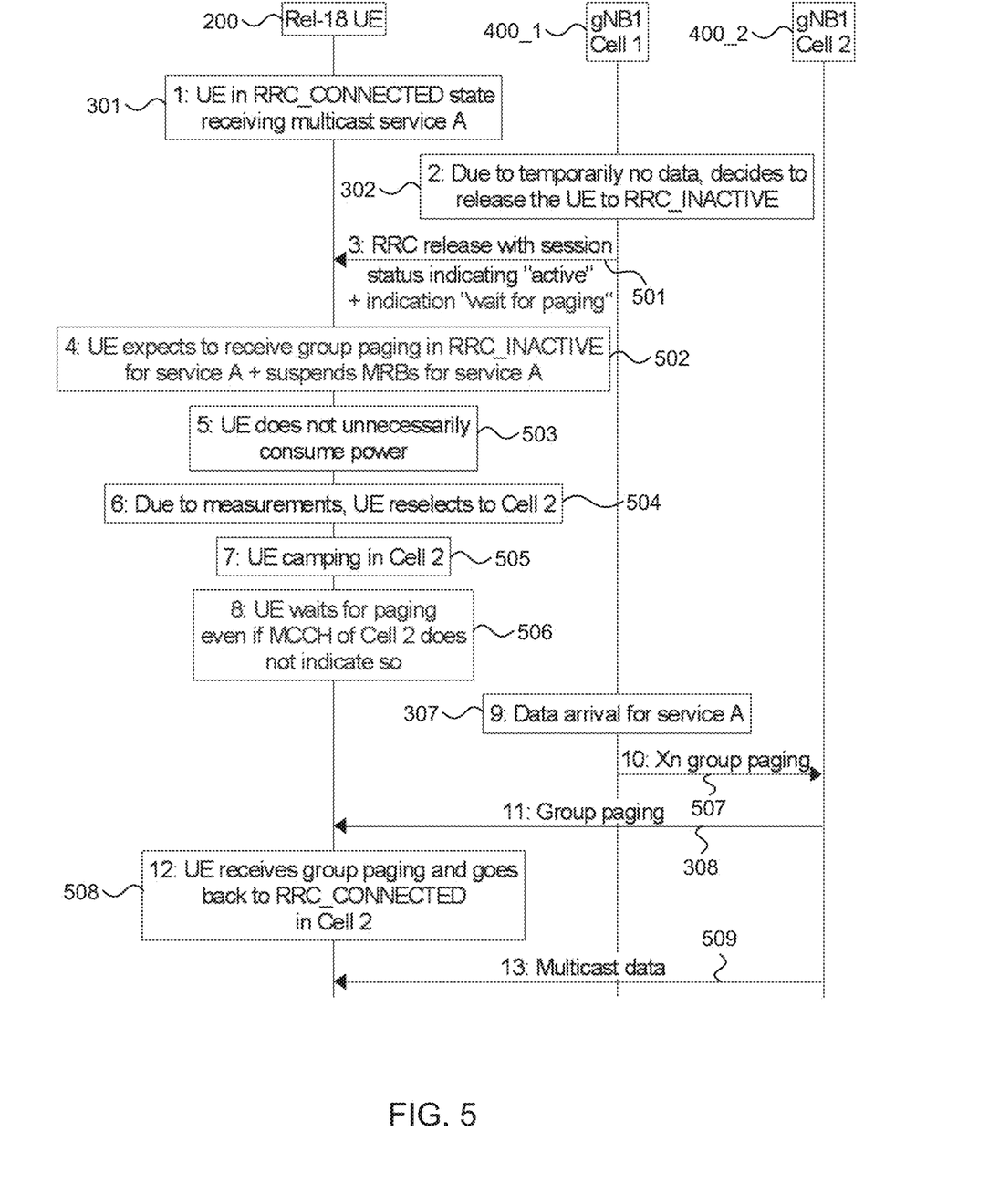
FIG. 5 illustrates a schematic representation of a signaling diagram according to an example embodiment.

FIG. 5 illustrates a schematic representation of a signaling diagram according to an example embodiment.

In the example embodiment of FIG. 5, in operation 301, the UE is in the RRC_CONNECTED state receiving a multicast service A.

In operation 302, due to temporarily no data arrival for the service A and there being no other services the UE receives, gNB1 decides to release the UE to the RRC_INACTIVE state. gNB1 may correspond to the network device 100.

According to an example embodiment, the network device is further caused to transmit the indicator in a radio resource control (RRC) release message or in a multicast and broadcast control channel (MCCH).

In other example embodiments, the network device 100 may, for example, transmit the indication in some other message or in a separate message.

According to an example embodiment, the client device 200 is further caused to obtain the indication in a radio resource control (RRC) release message or in a multicast and broadcast control channel (MCCH).

According to an example embodiment, the obtaining the indication comprises receiving an indicator from the network device 100 (step 501 in FIG. 5), wherein the indicator explicitly indicates to the client device 200 whether the client device 200 should wait for a paging message for the multicast session and stop monitoring data of the multicast session while the client device 200 is in the inactive state or detecting an absence of the indicator from the network device.

In other example embodiments, the client device 200 may, for example, receive the indicator in some other message or in a separate message.

According to an example embodiment, the multicast session comprises an active multicast session.

For example, in the example embodiment of FIG. 5, gNB1 cell 1 400_1 transmits and the UE 200 receives the indicator in an RRC release message 501. The RRC release message 501 may further indicate that the multicast session is active.

According to an example embodiment, the indicator indicates to the client device 200 whether the client device 200 should wait for paging for a multicast session.

The indicator can, for example, indicate to the client device 200 whether the client device 200 should wait for paging for a specific multicast session. In another example, the indicator may indicate to the client device 200 whether the client device 200 should wait for paging for all the multicast sessions.

In the example embodiment of FIG. 5 gNB1 transmits the RRC release message 501 comprising an indication that the service A is active and an indicator for "wait for paging", as the UE 200 will be paged upon data arrival for the multicast service A.

According to an example embodiment, the client device 200 is further caused to, in response to the indicator indicating that the client device 200 should wait for the paging message for the multicast session and stop monitoring the data of the multicast session while the client device 200 is in the inactive state, suspend radio bearers for the multicast session.

For example, in the example embodiment of FIG. 5, in operation 502, the UE 200 expects to receive group paging in the RRC_INACTIVE state for multicast service A and suspends the MRBs that it was using in the RRC_CONNECTED state for the multicast service A, as the RRC release is due to temporary no data activity. The UE 200 does not monitor G-RNTI for the multicast service A. Thus, the UE 200 does not unnecessarily consume power, as shown in step 503.

In operation 504, due to measurements, the UE 200 reselects cell 2 of gNB1 400_2 for camping. In operation 505, the UE 200 camps in cell 2 400_2. In operation 506, the UE 200 may wait for paging for the multicast service A, even if cell 2's 400_2 MCCH may indicate the multicast session as active and may not indicate "wait for paging".

In operation 307, data arrives for multicast service A.

Cell 1 of gNB1 400_1 transmits the group paging 507 to cell 2 of gNB1 400_2 via the Xn interface. The group paging 507 indicates that the data arrives for the multicast service A.

Cell 2 of gNB1 400_2 transmits the group paging 308 to the UE 200.

In operation 508, the UE 200 receives the group paging 308 indicating data arrival for the multicast service A and goes back to the RRC_CONNECTED state in cell 2 400_2 for data reception 509. Alternatively, using the enhanced group paging, the UE 200 can also stay in the RRC_INACTIVE state and receive data of the multicast session.

Figure 6:
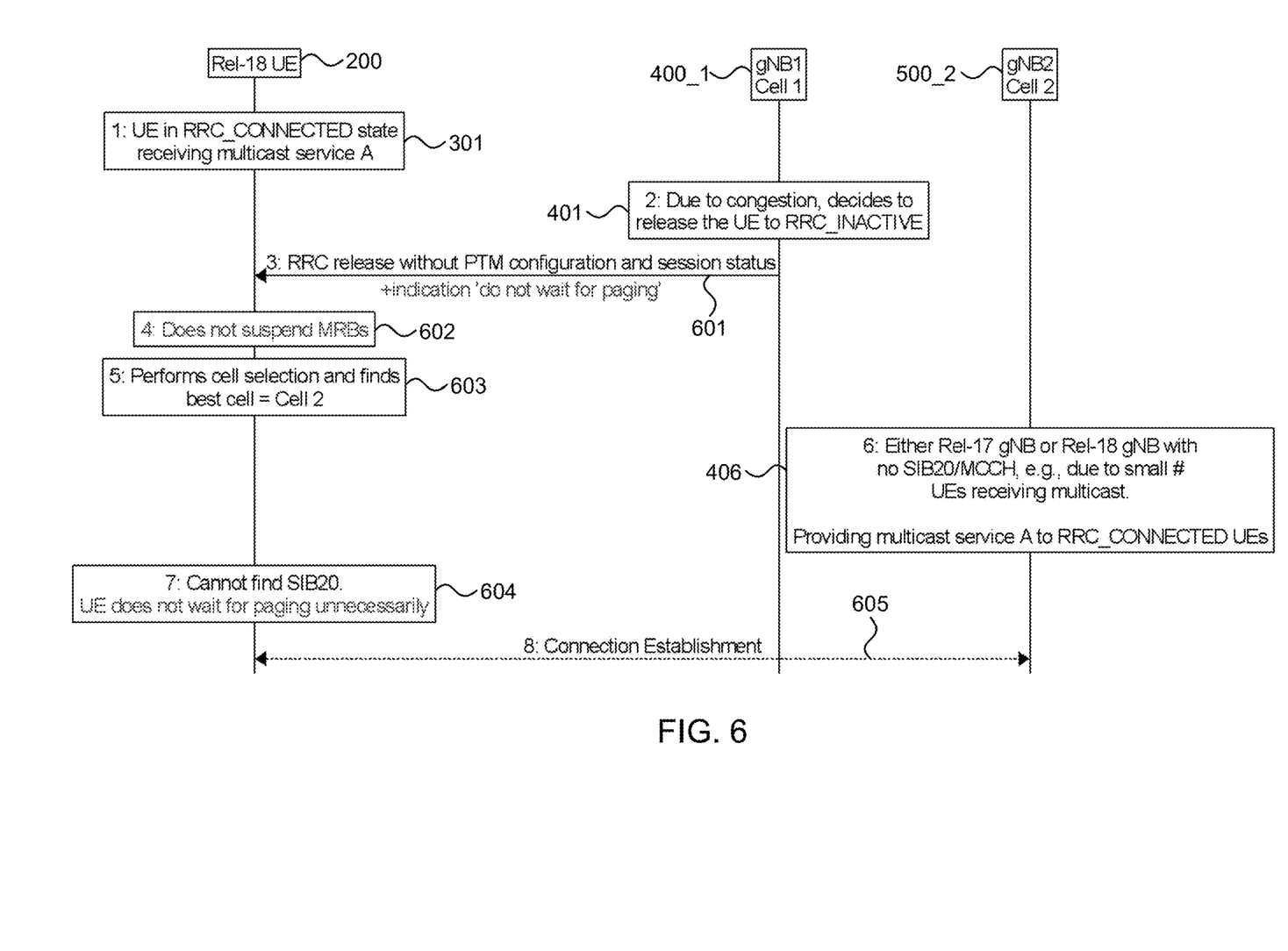
FIG. 6 illustrates a schematic representation of a signaling diagram according to an example embodiment.

FIG. 6 illustrates a schematic representation of a signaling diagram according to an example embodiment.

In the example embodiment of FIG. 6, in operation 301, the UE 200 is in the RRC_CONNECTED state receiving a multicast service A.

In operation 401, due to congestion for example, gNB1 decides to release the UE to the RRC_INACTIVE state.

According to an embodiment, the at least one memory 202 and the computer program code are further configured to, with the at least one processor 201, cause the client device 200 to, in response to the indicator indicating that the client device 200 should not wait for paging or not receiving the indicator from the network device 100, keep radio bearers for a multicast session active while the client device 200 is in the inactive state.

According to an example embodiment, the client device 200 is further caused to, in response to the indication indicating that the client device 200 should not wait for the paging message for the multicast session and monitor the data of the multicast session, keep radio bearers for the multicast session active and monitor the data of the multicast session while the client device 200 is in the inactive state.

According to an example embodiment, monitoring the data of the multicast session comprises monitoring a group radio network temporary identifier (G-RNTI) of the multicast session.

For example, in the example embodiment of FIG. 6, cell 1 of gNB 1 400_1 can transmit an RRC release message 601 without a PTM configuration or session status to the UE 200. Optionally, gNB1 can also provide an indicator for "do no wait for paging" to the UE 200, as the UE 200 is intended to receive the service in the RRC_INACTIVE state. Alternatively, non-existence of an explicit "wait for paging" can serve as the "do no wait for paging" indicator.

According to an embodiment, the client device 200 is further caused to, in response to obtaining the indication from a network device controlling a first cell and selecting a second cell controlled by a second network device for camping in the inactive state, receive the paging message according to the indication while the client device is camping in the second cell.

In some example embodiments, the network device and the second network device can be the same. In other example embodiments, they can be different devices.

For example, in some example embodiments, if the UE 200 is provided with a "wait for paging" indicator in the RRC release message, the UE 200 can still wait for paging and not try to decode any data, such as the G-RNTI, even in the case the UE 200 reselects a new cell for camping and the new cell does not indicate "wait for paging".

In some example embodiments, the client device 200 may be further caused to, in response to obtaining the indication from a network device controlling a first cell and selecting a second cell controlled by a second network device for camping in the inactive state, not wait to receive the paging message according to the indication while the client device is camping in the second cell.

For example, in some example embodiments, if the UE 200 is provided with the "do not wait for paging" indicator in the RRC release message, the UE 200 can still wait for paging and not try to decode any data, such as the G-RNTI, in a camped cell whose MCCH indicates "wait for paging".

For example, in the example embodiment of FIG. 6, in operations 602, the UE 200 does not suspend the MRBs. In operation 603, the UE 200 performs cell selection for initial camping and finds cell 2 of gNB2 500_2 as the best cell.

In operation 406, gNB2 does not provide multicast service to UEs in the RRC_INACTIVE state. This may be due to, for example, gNB2 being a Rel-17 gNB or a Rel-18 gNB with no SIB20/MCCH.

In operation 604, the UE 200 cannot find SIB20 in cell 2 of gNB2 500_2. Based on the explicit "do not wait for paging" indicator or based on non-existence of the "wait for paging" indicator, the UE 200 does not wait for paging and goes back to the RRC_CONNECTED state to receive multicast transmission 605 in the RRC_CONNECTED state by initiating the connection resumption or connection establishment procedure.

Figure 7:
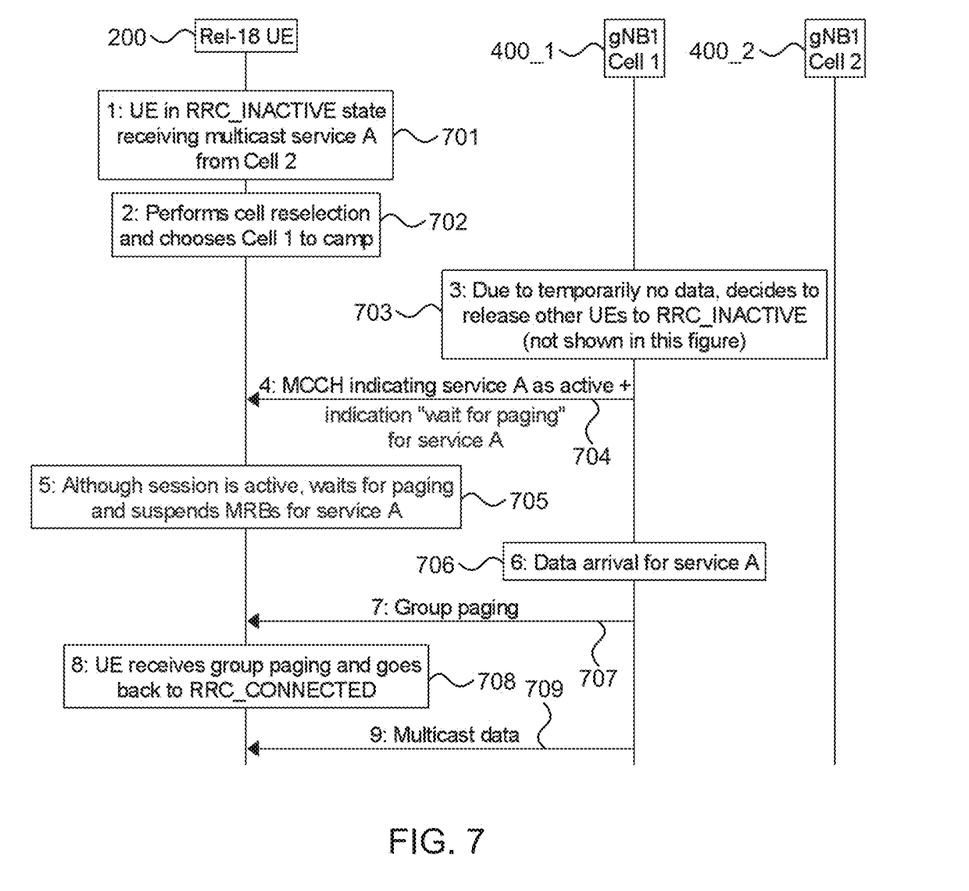
FIG. 7 illustrates a schematic representation of a signaling diagram according to an example embodiment.

FIG. 7 illustrates a schematic representation of a signaling diagram according to an example embodiment.

In the example embodiment of FIG. 7, in operation 701, the UE 200 is in the RRC_INACTIVE state receiving a multicast service A from cell 2 of gNB1 400_2.

In operation 702, due to measurements, the UE 200 reselects cell 1 of gNB1 400_1 for camping.

In operation 703, cell 1 of gNB1 400_1 releases some other UEs to the RRC_INACTIVE state due to there being temporarily no data.

According to an example embodiment the at least one memory 102 and the computer program code are further configured to, with the at least one processor 101, cause the network device 100 to transmit the indicator in MCCH.

According to an example embodiment, the at least one memory 202 and the computer program code are further configured to, with the at least one processor 201, cause the client device 200 to receive the indicator in MCCH.

For example, in the example embodiment of FIG. 7, MCCH 704 indicates for a multicast service A that service A is active, and that the UE 200 should wait for paging even though session A is active.

In operation 705, although the session is active, the UE 200 waits for paging and suspends MRBs for the multicast service A.

In operation 706, data arrival for multicast service A occurs and cell 1 of gNB1 400_1 pages 707 the UEs supporting the multicast service A involving the UE 200.

In operation 708, after receiving the paging, the UE 200 goes to the RRC_CONNECTED state for data reception 709. Alternatively, using the enhanced group paging, the UE 200 can also stay in the RRC_INACTIVE state and receive data.

Figure 8:
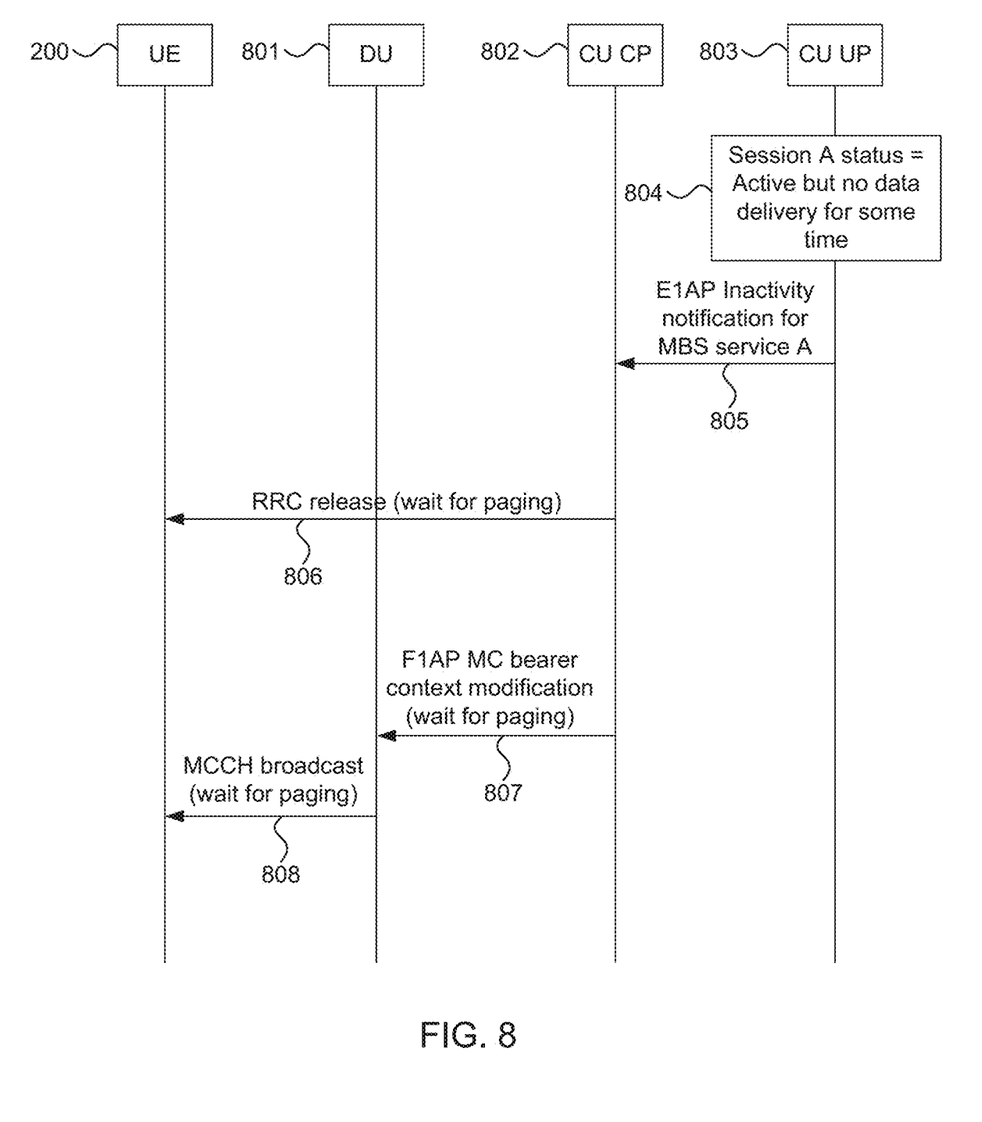
FIG. 8 illustrates a schematic representation of a signaling diagram according to an example embodiment.

FIG. 8 illustrates a schematic representation of a signaling diagram according to an example embodiment.

In the example embodiment of FIG. 8, the network device 100 comprises a split gNB comprising a distributed unit (DU) 801, a centralized unit (CU) control plane (CP) 802, and a CP user plane (UP) 803.

In operation 804, multicast session A is active but there is no data delivery for some time. The CU UP 803 can transmit an E1 application protocol (E1AP) inactivity notification 805 for service A to CU CP 802.

In some example embodiments, the CU CP 802 can transmit an RRC release message 806 comprising the "wait for paging" indicator to the UE 200. Any disclosure herein with respect to the indicator in the RRC release message may apply also to this example embodiment.

In some example embodiments, the CU CP 802 can transmit an F1 application protocol (F1AP) multicast bearer context modification (CU to DU RRC information) comprising the "wait for paging" indicator in operation 807 to the DU 801. The DU 801 can transmit MCCH broadcast comprising the "wait for paging" indicator to the UE 200 in operation 808. Any disclosure herein with respect to the indicator in the MCCH may apply also to this example embodiment.

Figure 9:
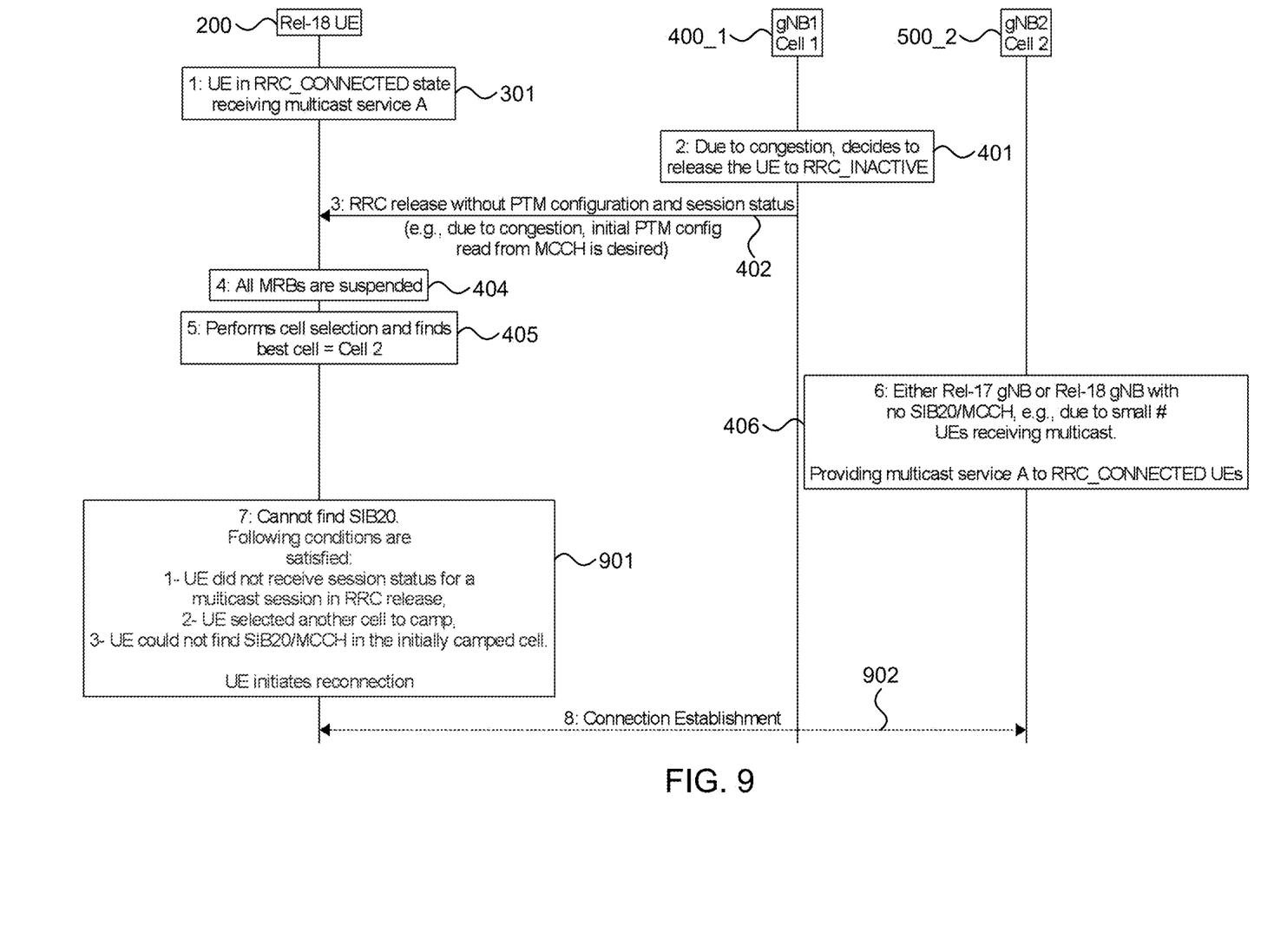
FIG. 9 illustrates a schematic representation of a signaling diagram according to an example embodiment.

FIG. 9 illustrates a schematic representation of a signaling diagram according to an example embodiment.

In the example embodiment of FIG. 9, in operation 301, the UE 200 is in the RRC_CONNECTED state receiving multicast service A.

In operation 401, due to congestion for example, gNB1 decides to release the UE 200 to the RRC_INACTIVE state.

Cell 1 of gNB1 400_1 transmits an RRC release message 402 without PTM configuration or session status to the UE 200.

In operation 404, the UE 200 suspends all MRBs.

In operation 405, the UE 200 performs initial cell selection and finds the best cell is cell 2 of gNB2 500_2.

In operation 406, cell 2 of gNB2 500_2 does not provide multicast service to UEs in the RRC_INACTIVE state. This may be due to, for example, gNB2 being a Rel-17 gNB or a Rel-18 gNB with no SIB20/MCCH.

According to an example embodiment, the client device 200 is further caused to, in response to the indication indicating that the client device should not wait for the paging message for the multicast session and monitor the data of the multicast session, switch to a connected state from the inactive state in response to at least one criterion being met.

For example, in the example embodiment of FIG. 9, the UE 200 did not receive an explicit indicator in the RRC release message 402. This can function as the indication that that the UE 200 should not wait for the paging message for the multicast session.

According to an example embodiment, the at least one criterion comprises at least: the client device 200 being sent to the inactive state from the connected state in a first cell controlled by the network device, the client device 200 switching to a second cell to camp in the inactive state; and the client device 200 not finding a multicast and MCCH in the second cell.

The first cell may comprise, for example, a cell from which the client device 200 received an RRC release message, such as cell 1 of gNB1 400_1 in the example embodiment of FIG. 9.

In other embodiments, the at least one criterion may further comprise other criteria and/or comprise different criteria.

In some example embodiments, the client device 200 may be configured to switch to the RRC_CONNECTED state in response to not receiving a session activation status and/or the indicator in the RRC release message, the client device 200 camping on a cell that is not the cell that sent the client device 200 to the RRC_INACTIVE state, and the camped cell not transmitting SIB20/MCCH.

For example, in the example embodiment of FIG. 9, in operation 901, the UE 200 cannot find SIB20 after switching to cell 2 of gNB2 500_2. As the following conditions are satisfied, the UE 200 comes back to the RRC_CONNECTED state by initiating connection resumption or establishment procedure and a connection is resumed or established 902:

1. the UE 200 did not receive session status for a multicast session that it joined in the RRC release message 402,
2. the UE 200 has selected another cell to initially camp compared to the cell that sent the UE 200 to the RRC_INACTIVE state, and
3. the UE 200 could not find SIB20 and/or MCCH in the initially camped cell.

Figure 10:
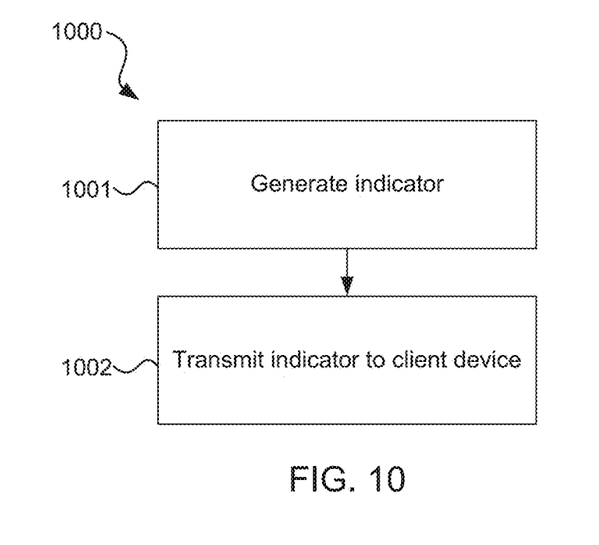
FIG. 10 illustrates a flow chart representation of a method according to an example embodiment.

FIG. 10 illustrates a flow chart representation of a method according to an example embodiment.

According to an embodiment, a method 1000 comprises generating 1001, by a network device, an indicator based on at least one of an activation status of a multicast session or a data inactivity status and transmitting 1002, by the network device, the indicator to a client device, wherein the indicator indicates to the client device whether the client device should wait for a paging message for the multicast session and stop monitoring data of the multicast session while the client device is in an inactive state.

The method 1000 may be performed by, for example, the network device 100.

Figure 11:
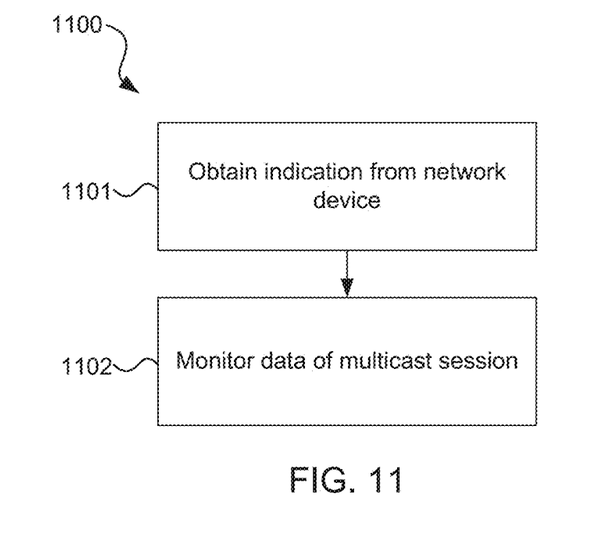
FIG. 11 illustrates a flow chart representation of a method according to an example embodiment.

FIG. 11 illustrates a flow chart representation of a method according to an example embodiment.

According to an embodiment, a method 1100 comprises, obtaining 1101, by a client device, an indication from a network device, wherein the indication indicates to the client device whether the client device should wait for a paging message for the multicast session and stop monitoring data of the multicast session while the client device is in an inactive state and based on the obtained indication, monitoring 1102, by the client device, the data of the multicast session while the client device is in the inactive state if the indication indicates that the client device should not wait for the paging message.

The method 1100 may be performed by, for example, the client device 200.

An apparatus may comprise means for performing any aspect of the method(s) described herein. According to an example embodiment, the means comprise at least one processor, and memory comprising program code, the at least one processor, and program code configured to, when executed by the at least one processor, cause performance of any aspect of the method.

The functionality described herein can be performed, at least in part, by one or more computer program product components such as software components. According to an example embodiment, the network device 100 and/or the client device 200 comprises a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), Systemon-a-chip systems (SOCs), Complex Programmable Logic Devices (CPLDs), and Graphics Processing Units (GPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. A client device, comprising:
   at least one processor; and
   at least one memory storing instructions that, when executed by the at least one processor, cause the client device of a multicast session to:
      obtain in a radio resource control (RRC) release message or in a multicast and broadcast control channel (MCCH) an indication from a network device, wherein the indication indicates to the client device whether the client device should wait for a paging message for the multicast session and stop monitoring data of the multicast session while the client device is in an inactive state; and
      based on the obtained indication, perform one of:
         monitor the data of the multicast session while the client device is in the inactive state, if the indication indicates that the client device should not wait for the paging message, or
         wait for the paging message for the multicast session and stop monitoring the data of the multicast session while the client device is in the inactive state, if the indication indicates that the client device should wait for the paging message for the multicast session and stop monitoring the data of the multicast session.

2. The client device according to claim 1, wherein the obtaining the indication comprises receiving an indicator, wherein the indicator explicitly indicates to the client device whether the client device should wait for a paging message for the multicast session and stop monitoring data of the multicast session while the client device is in the inactive state from network device or detecting an absence of the indicator from the network device.

3. The client device according to claim 1, wherein the multicast session comprises an active multicast session.

4. The client device according to claim 1, wherein the client device is further caused to, in response to the indication indicating that the client device should not wait for the paging message for the multicast session and monitor the data of the multicast session, keep radio bearers for the multicast session active and monitor the data of the multicast session while the client device is in the inactive state.

5. The client device according to claim 4, wherein monitoring the data of the multicast session comprises monitoring a group radio network temporary identifier (G-RNTI) of the multicast session.

6. The client device according to claim 1, wherein the client device is further caused to, in response to obtaining the indication from a network device controlling a first cell and selecting a second cell controlled by a second network device for camping in the inactive state, receive the paging message according to the indication while the client device is camping in the second cell.

7. The client device according to claim 1, wherein the client device is further caused to, in response to the indication indicating that the client device should not wait for the paging message for the multicast session and monitor the data of the multicast session, switch to a connected state from the inactive state in response to at least one criterion being met.

8. The client device according to claim 7, wherein the at least one criterion comprises at least:
   the client device being sent to the inactive state from the connected state in a first cell controlled by the network device,
   the client device switching to a second cell to camp in the inactive state; and
   the client device not finding a multicast and broadcast control channel, MCCH, in the second cell.

9. The client device according to claim 1, wherein the client device is further caused to: select a second cell to camp on; switch to a connected state in the second cell in response to not receiving SIB20/MCCH in the second cell.

10. The client device according to claim 9, wherein the client device is further caused to: receive an RRC release message from a first cell, the RRC release message not comprising the indication and/or a multicast session activation status.

11. A method comprising:
   obtaining, by a client device in a radio resource control (RRC) release message or in a multicast and broadcast control channel (MCCH), an indication from a network device, wherein the indication indicates to the client device whether the client device should wait for a paging message for the multicast session and stop monitoring data of the multicast session while the client device is in an inactive state; and based on the obtained indication, performing one of:
- monitoring, by the client device, the data of the multicast session while the client device is in the inactive state if the indication indicates that the client device should not wait for the paging message; or
- waiting, by the client device, for the paging message for the multicast session and stopping monitoring the data of the multicast session while the client device is in the inactive state, if the indication indicates that the client device should wait for the paging message for the multicast session and stop monitoring the data of the multicast session.

12. The method of claim 11, wherein the obtaining the indication comprises receiving an indicator, wherein the indicator explicitly indicates to the client device whether the client device should wait for a paging message for the multicast session and stop monitoring data of the multicast session while the client device is in the inactive state from network device or detecting an absence of the indicator from the network device.

13. The method of claim 11, further comprising: in response to the indication indicating that the client device should not wait for the paging message for the multicast session and monitor the data of the multicast session, keeping radio bearers for the multicast session active and monitoring the data of the multicast session while the client device is in the inactive state.

14. The method of claim 11, further comprising: in response to the indication indicating that the client device should not wait for the paging message for the multicast session and monitor the data of the multicast session, switching to a connected state from the inactive state in response to at least one criterion being met, wherein the at least one criterion comprises at least:
- the client device being sent to the inactive state from the connected state in a first cell controlled by the network device,
- the client device switching to a second cell to camp in the inactive state; and
- the client device not finding a multicast and broadcast control channel, MCCH, in the second cell.

15. The method of claim 11, further comprising: selecting a second cell to camp on; switching to a connected state in the second cell in response to not receiving SIB20/MCCH in the second cell.

16. The client device according to claim 15, further comprising: receiving an RRC release message from a first cell, the RRC release message not comprising the indication and/or a multicast session activation status.

* * * * *